(12) United States Patent
Van Der Vecht (10) Patent No.: US 12,203,498 B2
(45) Date of Patent: Jan. 21, 2025

(54) RETAINING ELEMENT, A SHAFT ASSEMBLY AND METHODS FOR ASSEMBLING OR DISASSEMBLING THE SHAFT ASSEMBLY

(71) Applicant: Punch Powertrain E-Vehicles NV, Sint-Truiden (BE)

(72) Inventor: Jan Willem Van Der Vecht, Sint-Truiden (BE)

(73) Assignee: PUNCH POWERTRAIN E-VEHICLES NV, Sint-Truiden (BE)

( * ) Notice: Subject to any disclaimer, the term of this patent is extended or adjusted under 35 U.S.C. 154(b) by 48 days.

(21) Appl. No.: 17/796,404

(22) PCT Filed: Feb. 16, 2021

(86) PCT No.: PCT/EP2021/053783
§ 371 (c)(1),
(2) Date: Jul. 29, 2022

(87) PCT Pub. No.: WO2021/165265
PCT Pub. Date: Aug. 26, 2021

(65) Prior Publication Data
US 2023/0341001 A1 Oct. 26, 2023

(30) Foreign Application Priority Data
Feb. 18, 2020 (BE) .............................. BE 2020/5106

(51) Int. Cl.
*F16B 21/18* (2006.01)
*F16C 35/063* (2006.01)

(52) U.S. Cl.
CPC .......... *F16B 21/186* (2013.01); *F16C 35/063* (2013.01); *Y10S 403/07* (2013.01)

(58) Field of Classification Search
CPC ...... F16B 21/18; F16B 21/186; F16C 35/063; Y10S 403/07; Y10T 403/581; Y10T 403/60
(Continued)

(56) References Cited

U.S. PATENT DOCUMENTS 2,450,425 A * 10/1948 Frisby ................... F16B 21/186
411/517
2,648,557 A * 8/1953 Stewart, Sr. ............ F16B 21/18
403/355
(Continued)

FOREIGN PATENT DOCUMENTS

DE        7535901 U      4/1976
DE    2629436 B1 * 12/1977 .............. F16B 21/18
(Continued)

OTHER PUBLICATIONS

International Search Report dated Mar. 10, 2021, issued in corresponding International Application No. PCT/EP2021/053783 (5 pgs.).
(Continued)

*Primary Examiner* — Josh Skroupa
(74) *Attorney, Agent, or Firm* — Pillsbury Winthrop Shaw Pittman LLP (57) ABSTRACT

A shaft assembly for a rotating machine, comprising a shaft, a clamping element and a retaining element. The clamping element can be implemented as a circlip for counteracting or limiting axial movement of a shaft attribute. Further, the retaining element has a mainly annular geometry extending in a circumferential direction around the shaft. Also, the retaining element is provided with a locking element located offset from the shaft such that the clamping element is radially locked between the shaft and the locking element.

11 Claims, 6 Drawing Sheets

(58) Field of Classification Search
USPC ............. 403/316, 326, DIG. 7; 411/353, 517
See application file for complete search history.

(56) References Cited

U.S. PATENT DOCUMENTS

| | | | | |
|---|---|---|---|---|
| 4,364,615 A | * | 12/1982 | Euler | .................... F16C 35/063 |
| | | | | 384/903 |
| 5,127,764 A | | 7/1992 | Baer | |
| 5,484,242 A | | 1/1996 | Meyer | |
| 5,746,517 A | * | 5/1998 | Durham | ................ F16C 35/063 |
| | | | | 384/903 |
| 7,490,695 B2 | * | 2/2009 | Segawa | ................. F16C 35/063 |
| | | | | 180/444 |

FOREIGN PATENT DOCUMENTS

| | | | | |
|---|---|---|---|---|
| DE | 3827242 A1 | * | 2/1990 | ............. F16B 21/18 |
| DE | 102004054717 A1 | * | 1/2006 | ............ F16C 35/063 |
| DE | 102005007384 A1 | | 8/2006 | |
| DE | 102014213924 A1 | * | 1/2016 | ............. F16D 1/116 |
| DE | 102018110879 A1 | | 11/2019 | |
| EP | 1693588 A2 | * | 8/2006 | ............. F16B 21/18 |
| JP | 58-25810 U | | 2/1983 | |
| JP | 11171026 A | * | 6/1999 | ............ F16C 35/063 |
| JP | 2016-125503 A | | 7/2016 | |
| JP | 2018197525 A | * | 12/2018 | ........... F02N 15/065 |

OTHER PUBLICATIONS

Written Opinion of the International Searching Authority dated Mar. 10, 2021, issued in corresponding International Application No. PCT/EP2021/053783 (7 pgs.).

* cited by examiner

RETAINING ELEMENT, A SHAFT ASSEMBLY AND METHODS FOR ASSEMBLING OR DISASSEMBLING THE SHAFT ASSEMBLY

CROSS-REFERENCE TO RELATED APPLICATIONS

This is the U.S. National Stage of PCT/EP2021/053783, filed Feb. 16, 2021, which claims priority to Belgium Patent Application No. BE 2020/5106, filed Feb. 18, 2020, and all contents of each of these applications are incorporated herein by reference in their entireties.

The invention relates to a shaft assembly for a rotating machine, comprising a shaft which is configured to rotate and to transfer torque, a clamping element, such as a circlip, positioned on the shaft for counteracting or limiting movement of a shaft attribute, such as a bearing, gear or rotor, mounted on the shaft in at least one axial direction, and a retaining element positioned on the shaft.

Typically, a shaft assembly may be included in a rotating machine such as an electric machine or electric powertrain. The shaft assembly may include comprise several bearings in order to transfer axial and/or radial loads from the shafts to a housing of a powertrain. The bearings are usually located at a specific axial position. In order to maintain the shaft at an aligned orientation and to prevent damage to the bearings and/or shaft, the bearings are often fixed between axially fixed elements like between a circlip on the shaft and a powertrain housing. It is however still possible that the bearings move in an axial direction, especially when the shaft is running at high speeds, for example a rotor shaft in an electric machine. At high speeds circlips may start to lift off. Then, on the shaft might be reduced or completely eliminated. The circlip might lift of from its radial seat on the shaft which reduces the axial thrust surface and load capacity.

A circlip is generally known as an annular shaped clamping element configured to be mounted, for example snapped, onto a rotatable shaft allowing rotation but preventing lateral movement of a shaft attribute, for example a bearing assembly or a sprocket or of any other element mounted on said rotatable shaft. The circlip may for example fit into a groove on the rotatable shaft. However, in case of relatively high rotational speeds, centrifugal forces acting on the circlip may cause the circlip to expand radially. When said forces become so large that an inner diameter of the circlip becomes larger than an outer diameter of the shaft on which the circlip is mounted, the circlip might lose an engaging contact with the shaft, or even jump out of the groove and/or off the axis, such that axial movement or precession of adjacent elements such as the shaft attribute becomes possible, potentially leading to heavy axial load, e.g. on a bearing or housing thereby reducing efficiency and exposing components to damage and/or reducing component lifetime.

In order to prevent said undesired situations, retaining elements have been developed. These retaining elements may for example have a shape of a slide-over retaining ring, located at the shaft attribute side of the circlip, a press-on retaining ring, located at a side of the circlip facing away from the shaft attribute, or a lock nut, also located at a side of the circlip facing away from the shaft attribute. However, such retaining elements may be relatively bulky requiring quite a lot of space in an axial direction. Moreover, they require specific tooling during assembly, especially when a shaft may not be readily accessible anymore and/or high accuracy conditions are required when assembling. As a consequence, they cannot be widely used.

Therefore, it is an aim of the present invention to solve or alleviate one or more of the above-mentioned disadvantages. In particular, the invention aims at providing a shaft assembly for a rotating machine provided with a retaining element that is widely usable.

Thereto, according to an aspect of the invention, a shaft assembly for a rotating machine is provided, comprising a shaft which is configured to rotate and to transfer torque; a clamping element positioned on the shaft for counteracting movement of a shaft attribute mounted on the shaft in at least one axial direction, the clamping element having a mainly annular geometry extending in a circumferential direction around the shaft, the clamping element further having two circumferential end portions opposing each other, wherein the clamping element is elastically deformable between a relaxed state wherein the circumferential end portions are located relatively close to each other and a widened state wherein the end portions are located relatively remote from each other in the circumferential direction; and a retaining element positioned on the shaft, the retaining element having a mainly annular geometry extending in a circumferential direction around the shaft, the retaining element further being provided with a locking element located offset from the shaft such that the clamping element is radially locked between the shaft and the locking element.

By providing the retaining element with a locking element located offset from the shaft such that the clamping element is radially locked between the shaft and the locking element, the retaining element effectively counteracts axial movement of the clamping element also when the clamping element looses engaging contact with the shaft and starts lifting off, e.g. at relatively high shaft speeds, thereby counteracting damage and/or reduced component lifetime, while, on the other hand, the retaining element may be widely used.

The retaining element provided with the locking element located offset from the shaft for radially locking the clamping element may also be applied in configurations where space in axial direction along the shaft is limited. Further, the retaining element may be easy to mount or assemble on the shaft. Then, the retaining element can advantageously be used as a standard component.

Advantageously, the retaining element is mainly elastically non-deformable in a radial direction from a center axis, thereby effectively enabling a function of limiting radial movement of the clamping element.

Preferably, the retaining element includes a closed annular frame for improving a structure that has a relatively high radial stiffness. If the frame material has an inherent high stiffness, the frame may be interrupted in the circumferential direction having circumferential ends.

More preferably, the retaining element includes a circumferentially open or closed annular sheet, e.g. a metal sheet thus providing an implementation with reduced axial dimensions for occupying a very limited axial space on the shaft. Then, the retaining element is widely applicable and can be used as a standard component.

Advantageously, the retaining element includes at least one locking element formed as a lug, also referred to as spring lug or lash, extending radially inwardly towards the clamping element.

Preferably, a multiple number of lugs mainly are evenly distributed in the circumferential direction and concentrically surrounding the clamping element so as to perform the radial locking function in a circumferentially balanced manner.

Advantageously, the radially inwardly extending lug or lugs are elastically deformable between a relaxed position radially locking the clamping element and a tensioned position radially releasing the clamping element. Preferably, the lug or lugs are elastically deformable in the axial direction so as to effectively providing a locking and releasing functionality of the clamping element in the radial direction.

In an embodiment, the retaining element includes a flange part extending in the circumferential direction, axially offset from the lug in its relaxed position, located between the clamping element and the shaft attribute, so as to transfer axial forces between components located at axial opposites to the retaining element.

The flange part may be formed as an open or closed inner annular shaped structure or ring segment shaped structure. Further, the retaining element may include a multiple number of flange parts, preferably mainly evenly distributed in the circumferential direction. Further, the lugs and the flange parts preferably alternate in the circumferential direction.

The invention also relates to a retaining element.

Further, the invention relates to a method for assembling a shaft assembly and a method for de-assembling a shaft assembly.

Further advantageous embodiments according to the invention are described in the following claims.

It should be noted that the technical features described above or below may each on its own be embodied in a shaft assembly and/or in a method, i.e. isolated from the context in which it is described, separate from other features, or in combination with only a number of the other features described in the context in which it is disclosed. Each of these features may further be combined with any other feature disclosed, in any combination.

The invention will be further elucidated on the basis of exemplary embodiments which are represented in the drawings. The exemplary embodiments are given by way of non-limitative illustration of the invention. In the drawings.

In the figures identical or corresponding parts are represented with the same reference numerals. The drawings are only schematic representations of embodiments of the invention, which are given by manner of non-limited examples.

Figure 1A:
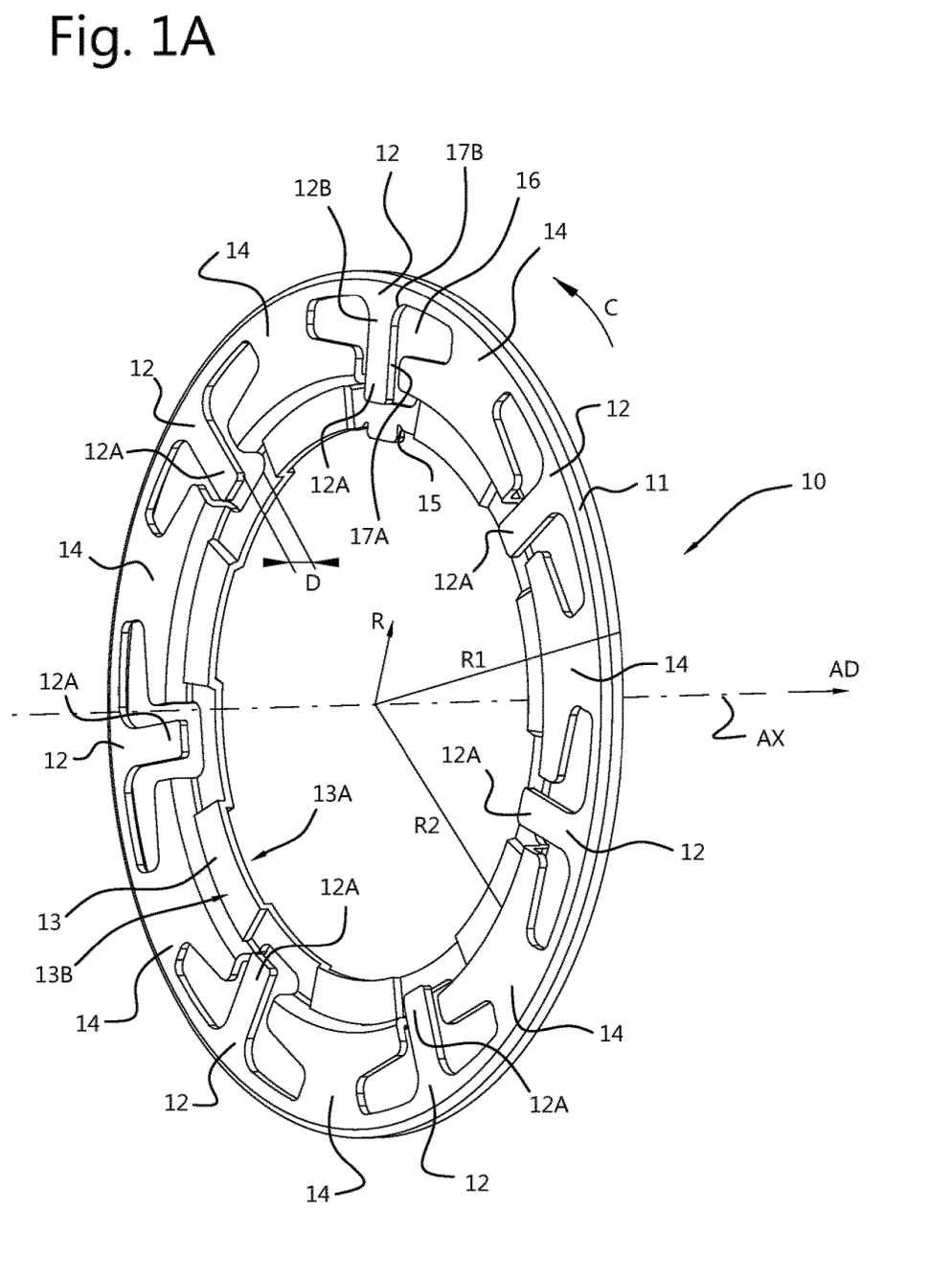
FIG. 1A shows a schematic perspective view of a retaining element according to an aspect of the invention.
Figure 2A:
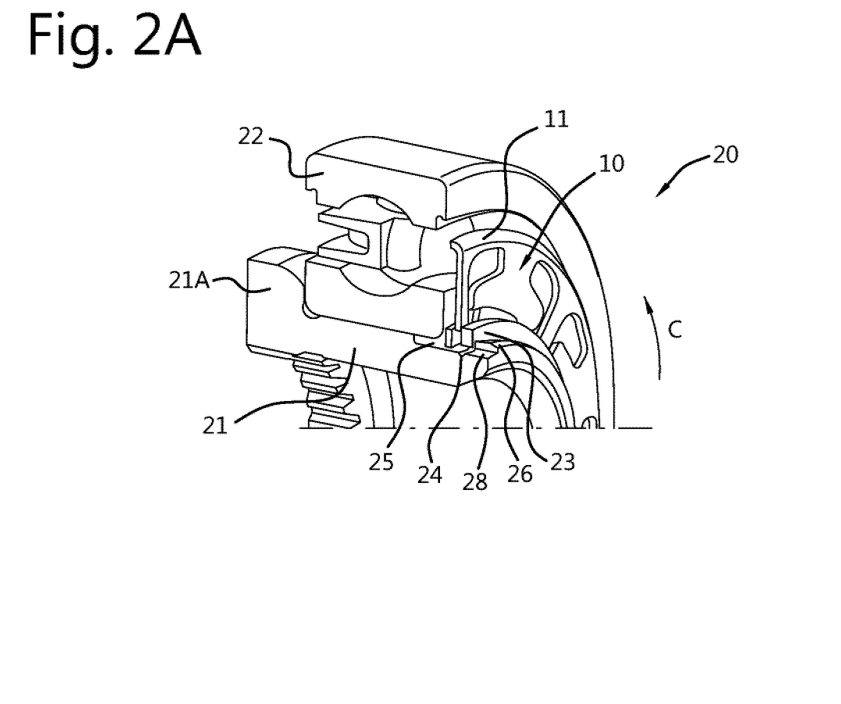
FIG. 2A shows a schematic perspective cross sectional partial view of a shaft assembly according to an aspect of the invention including the retaining element of FIG. 1 in a first state.
Figure 2B:
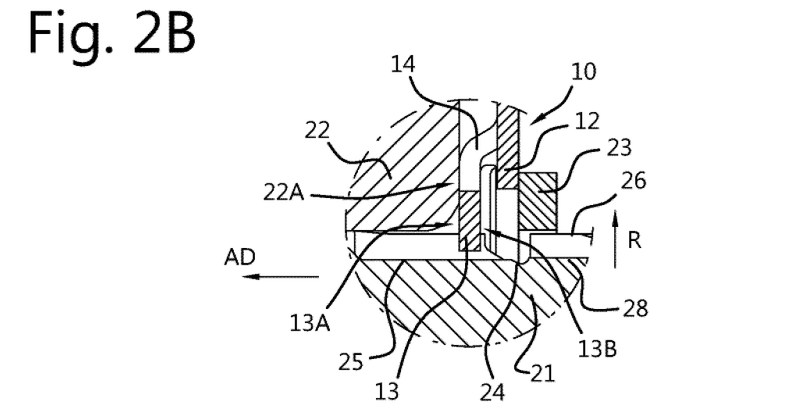
FIG. 2B shows a schematic cross sectional partial view of the shaft assembly of FIG. 2A.

FIG. 1A shows a schematic perspective view of a retaining element 10 according to an aspect of the invention. The retaining element 10 is configured to be positioned on a shaft that is configured to rotate and to transfer torque as described below. On the shaft a shaft attribute such as a gear, a bearing or a rotor has been mounted. Further, a clamping element such as a circlip is positioned on the shaft for counteracting movement of the shaft attribute in at least one axial direction along the shaft as described in more detail referring to FIG. 2.

As shown in FIG. 1A the retaining element 10 has an outer ring-shaped structure or annular frame 11 that is closed in a circumferential direction C at a radius R1 around a center axis AX. In the shown embodiment, the retaining element 10 includes an annular sheet, e.g. a metal sheet thus providing an implementation with reduced axial dimensions for occupying a very limited axial space on the shaft. In principle, the sheet can be formed as a single piece such as from a flat sheet metal. However, alternatively, the sheet can be composed from multiple parts. Advantageously, the retaining element 10 is further mainly elastically non-deformable in a radial direction R from the center axis AX so as to provide locking features in the radial direction R relative to the clamping element as described below.

The retaining element 10 shown in FIG. 1A further includes a multiple number of lugs 12, also referred to as spring lugs or retaining lashes, extending radially inwardly from the outer ring-shaped structure 11 towards the center axis AX for preventing radial expansion of the clamping element 23 in mounted condition of a shaft assembly. The lugs 12 are preferably mainly evenly distributed in the circumferential direction C to exert a circumferentially balanced counterforce on the clamping element positioned on the shaft. The lugs 12 have free lug ends 12A pointing to the center axis AX. Responsive to an applied axial force, the lugs may be axially elastically deformed for locking and releasing, respectively, the clamping element on the shaft.

The retaining element 10 as shown in FIG. 1A also includes a flange part extending in the circumferential direction C forming an inner, flanged ring-shaped structure 13 having a radius R2 that is smaller than the radius R1 of the outer ring-shaped structure 11. Further, the inner ring-shaped structure 13 is slightly axially offset along an offset distance D in an axial direction AD relative to the lugs 12. The retaining element shown in FIG. 1A is further provided with intermediate parts 14 interconnecting the outer ring-shaped structure 11 with the inner ring-shaped structure 13. The intermediate parts 14 and the lugs 12 are alternately located in the circumferential direction C.

In assembled condition, the flange part or inner ring-shaped structure 13 may transfer axial forces from and/or towards components located axially next to the retaining element 10, e.g. a clamping element and a shaft attribute. The metal sheet, inner ring-shaped structure 13 includes a shaft assembly facing surface 13A and a clamping element facing thrust surface 13B, opposite to the shaft assembly facing thrust surface 13A.

In the shown embodiment, an radial inner contour of the inner ring-shaped structure 13 is provided with an optional key profile 15 for rotational fixation to the shaft.

Further, in the shown embodiment, the lugs 12 extend from the outer ring-shaped structure 11 in a radial direction towards the center axis AX, through an opening 16 between the intermediate parts 14. The lugs 12 each have a first strip-shaped lug portion 12B with side contours 17B tapering from the outer ring-shaped structure 11. Further, the lugs 12 each have a second strip-shaped lug portion 12A, also referred to as strip-shaped lug end 12A, adjoining the first strip-shaped lug portion 12B, the second strip-shaped lug portion 12A having mainly parallel side contours 17A. The tapering side contours 17B of the first strip-shaped lug portion 12B may be curved.

Figure 1B:
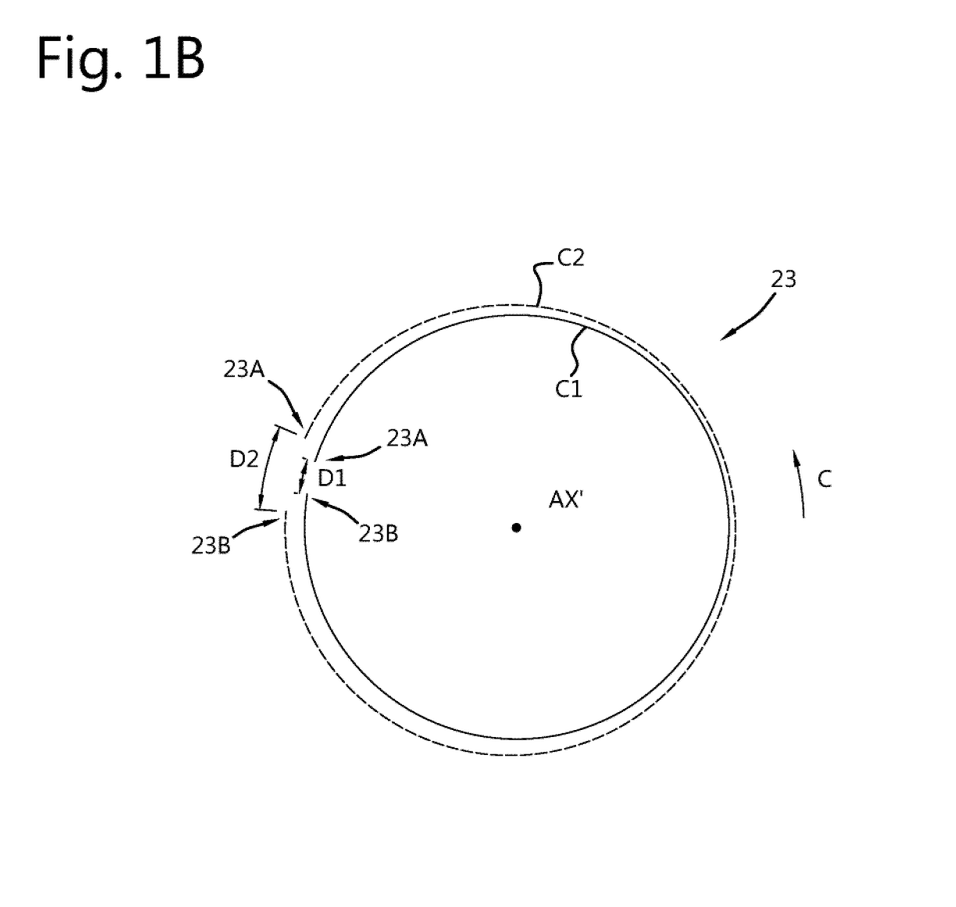
FIG. 1B shows a schematic view of a clamping element.

FIG. 1B shows a schematic view of a clamping element 10. The clamping element 23 is arranged to be positioned on a shaft for counteracting or limiting movement of a shaft attribute mounted on the shaft in at least one axial direction along the shaft. The clamping element 23 has a mainly annular geometry extending in the circumferential direction C around its center axis AX'. The clamping element 23 further has two circumferential end portions 23A,B opposing each other. The clamping element 23 is elastically deformable between a relaxed state and a widened state. In the relaxed state, the circumferential end portions 23A,B are located relatively close to each other, at a distance D1. Then, the clamping element 23 follows a first contour C1. In the widened state, the circumferential end portions 23A,B are located relatively remote from each other in the circumferential direction C, at a distance D2, D2 being larger than D1. Then, the clamping element 23 follows a second contour C2 having a larger radius of curvature than the first contour C1 has.

In the widened state, the clamping element 23 can be shifted along the shaft until reaching a desired axial position. Then, the clamping element 23 clamps itself to the outer surface of the shaft maintaining its axial position even when an axially oriented shifting force is applied. Alternatively, the clamping element 23 can be aligned with a groove circumventing the outer surface of the shaft, subsequently snapping into said groove and partially or completely deforming to its relaxed state. Again, the clamping element is resistance to an axially oriented shifting force maintaining its axial position.

The clamping element 23 can be implemented as a circlip.

FIG. 2A shows a schematic perspective cross sectional partial view of a shaft assembly 20 according to an aspect of the invention including the retaining element of FIG. 1 in a first state. The shaft assembly 20 includes a shaft 21 that is configured to rotate and to transfer torque. The shaft assembly 20 further includes a shaft attribute 22 mounted on the shaft 21, a clamping element 23 described referring to FIG. 1B above and a retaining element 10 referring to FIG. 1A above. The shaft assembly 20 is a part of a machine, e.g. an electric machine. The shaft 21 may rotate at relatively high speed, e.g. above circa 6000 revolutions per minute RPM such as circa 8000 RPM, 10.000 RPM or even at a higher speed such as 12.000 RPM or 14.000 RPM.

The shaft attribute 22, the clamping element 23 and the retaining element 10 are positioned concentrically relative to the shaft 21 having the common center axis AX.

In the shown embodiment, the clamping element 23 is arranged so as to counteract or limit a shift movement of the shaft attribute 22 in an axial direction along the shaft to the right, thereby locking the shaft attribute 22 axially against a local radial bulge 21A of the shaft 21. The shaft 21 is provided with a groove 24 running circumferentially in the outer radial surface 25 of the shaft 21 for receiving the clamping element 23.

In FIG. 2A, the shaft assembly 20 is shown in a first state of an assembling process wherein the retaining element 10 has been shifted on the shaft 21 in the axial direction AD reaching the shaft attribute 22, and wherein the clamping element 23 has also been shifted on the shaft 21 in the axial direction AD.

FIG. 2B shows a schematic cross sectional partial view of the shaft assembly of FIG. 2A. As shown, in the first state, the retaining element has been shifted against an axial end face 22A of the shaft attribute 22. Further, the clamping element 23 has been shifted until reaching the lugs 12 of the retaining element 10.

In an assembled state, the clamping element 23 has moved towards an axial position on the shaft 21 wherein the clamping element 23 is radially locked between the shaft 21 and the lugs 12 of the retaining element 10, the lugs 12 forming radial locking elements.

Figure 3A:
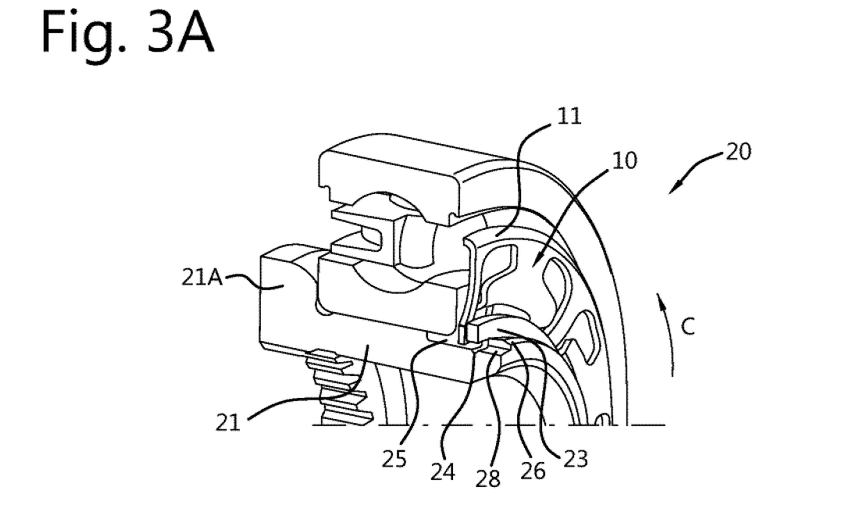
FIG. 3A shows a schematic perspective cross sectional partial view of the shaft assembly of FIG. 2A in a second state.
Figure 3B:
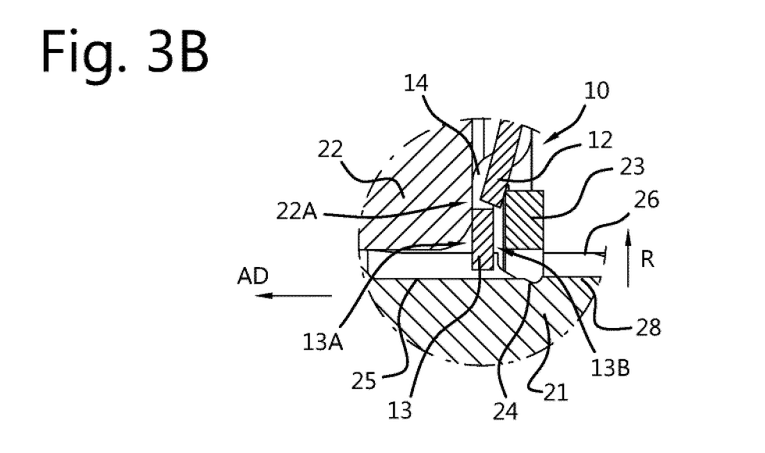
FIG. 3B shows a schematic cross sectional partial view of the shaft assembly of FIG. 3A.

FIG. 3A shows a schematic perspective cross sectional partial view of the shaft assembly of FIG. 2A in a second state following the first state, and FIG. 3B shows a schematic cross sectional partial view of the shaft assembly of FIG. 3A. In the second state, the clamping element 23 has been pushed in the axial direction AD, towards the shaft attribute 22, against the retaining element 10, such that the radially inwardly extending lugs 12 of the retaining element 10 elastically deform from a relaxed position to a tensioned position wherein the lug ends 12A bend towards the shaft attribute 22. The lugs 12 are elastically deformable in the axial direction AD. Here, the lugs or lashes 12 behave like a spring giving axial way to the clamping element 23. Then, the clamping element 23 can be axially aligned with the groove 24 in the shaft 21.

Figure 4A:
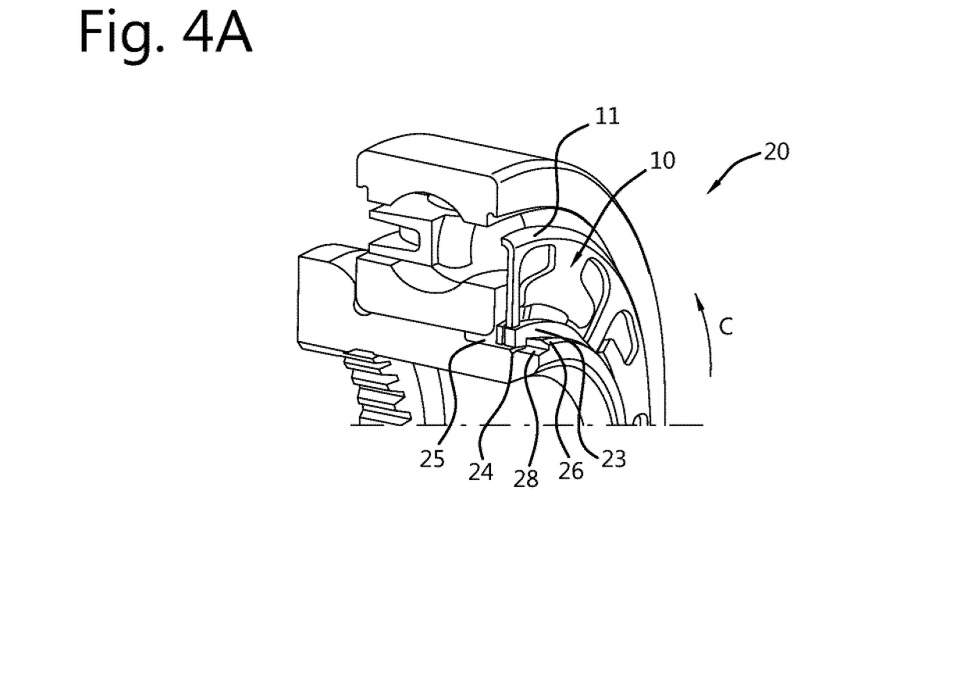
FIG. 4A shows a schematic perspective cross sectional partial view of the shaft assembly of FIG. 2A in a third state.
Figure 4B:
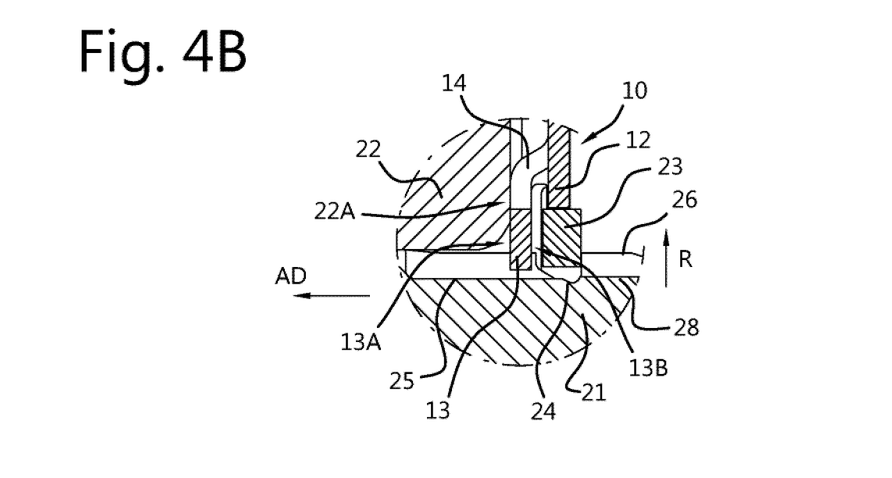
FIG. 4B shows a schematic cross sectional partial view of the shaft assembly of FIG. 4A.

FIG. 4A shows a schematic perspective cross sectional partial view of the shaft assembly of FIG. 2A in a third state, following the second state, and FIG. 4B shows a schematic cross sectional partial view of the shaft assembly of FIG. 4A. In the third state, the clamping element 23 has snapped into the groove 24 such that the lugs or lashes 12 of the retaining element 10 elastically deforms back to the relaxed position, thereby radially locking the clamping element 23 between the lug ends 12A and the shaft 21.

Here, the lugs 12, especially the lug ends 12A, form locking elements radially locking the clamping element 23 in a gap between the lugs 12 and the shaft 21. In the third or assembled state, the lugs 12, especially the lug ends 12A, extend radially inwardly towards the clamping element 23, while surrounding the clamping element 23 in the circumferential direction C.

Further, the inner ring-shaped structure 13 of the retaining element 10 is axially located between the shaft attribute 22 and the clamping element 23. The structure 13 includes a shaft assembly facing surface 13A and a clamping element facing thrust surface 13B, opposite to the shaft assembly facing thrust surface 13A for transferring axial forces between the shaft assembly 22 and the clamping element 23.

In a process of elastically deforming the lugs 12 from a relaxed position to a tensioned position, from the first state to the second state, the lugs 12 bend towards the shaft attribute 22, the lug ends 12A moving in the axial direction AD. Similarly, in a process of elastically deforming back, from the tensioned position to the relaxed position, from the second state to the third state, the lugs 12 straighten, now pointing towards the clamping element 23 and locking the clamping element.

Then, the clamping element 23 is locked both in radial direction R, by the lugs 12 and the shaft 21, and in the axial direction AD by the groove 24 in the shaft 21, thereby limiting a movement of the clamping element 23 in a radial direction R away from the shaft 21. Then, the retaining element acts like a strap counteracting that the clamping element 23 lifts off, e.g. during high speed conditions of the shaft 21.

It is noted that, in principle, the lugs 12 may be evenly distributed in the circumferential direction C or may be positioned in another circumferential distribution, e.g. in pairs. Further, the retaining element 10 may include more or less lugs 12 than shown in FIG. 1, e.g. six, eight, ten or twelve lugs or less than six lugs, e.g. two or three lugs, or even one lug, or more than twelve lugs, e.g. twenty lugs.

The groove 24 may be formed in the outer surface 25 of the shaft 21 having a geometry and dimensions in conformity with the geometry and/or dimensions of the clamping element 23. Alternatively, the groove may have another geometry and/or dimensions, e.g. having broader axial dimensions also receiving the inner ring-shaped structure 13 of the retaining element 10, as shown in FIG. 4B. The groove may be formed as a radial recess in the outer surface 25 of the shaft 21 extending in the circumferential direction C. Further, the groove may be formed by a local shaft portion 25 extending in the circumferential direction C having a smaller radius than an adjacent shaft portion 26 that is axially more remote from the shaft attribute 22, to the right in FIG. 2A. The adjacent shaft portion 26 may have a recess 28 at a circumferential position, e.g. for facilitating an assembling and/or de-assembling process.

When performing a de-assembling process, steps can be carried out in a reverse order, moving the clamping element 23 from an axial position on the shaft 21 wherein the clamping element 23 is axially locked between the shaft 21 and the locking element 12 of the retaining element 10, axially away from the shaft attribute 22.

Starting from the third or assembled state as shown in FIGS. 4A and 4B, the radially inwardly extending lugs 12 may be elastically deformed from the relaxed position towards the tensioned position bending towards the shaft attribute 22, thereby radially releasing the clamping element 23. As a next step, the clamping element 23 can be elastically deformed towards the widened state enabling the clamping element 23 to be axially moved away from the shaft attribute 22, e.g. to be removed from the shaft 21. Then, the retaining element 10 can be axially moved away from the shaft attribute 22, e.g. to be removed from the shaft 21.

Figure 5:
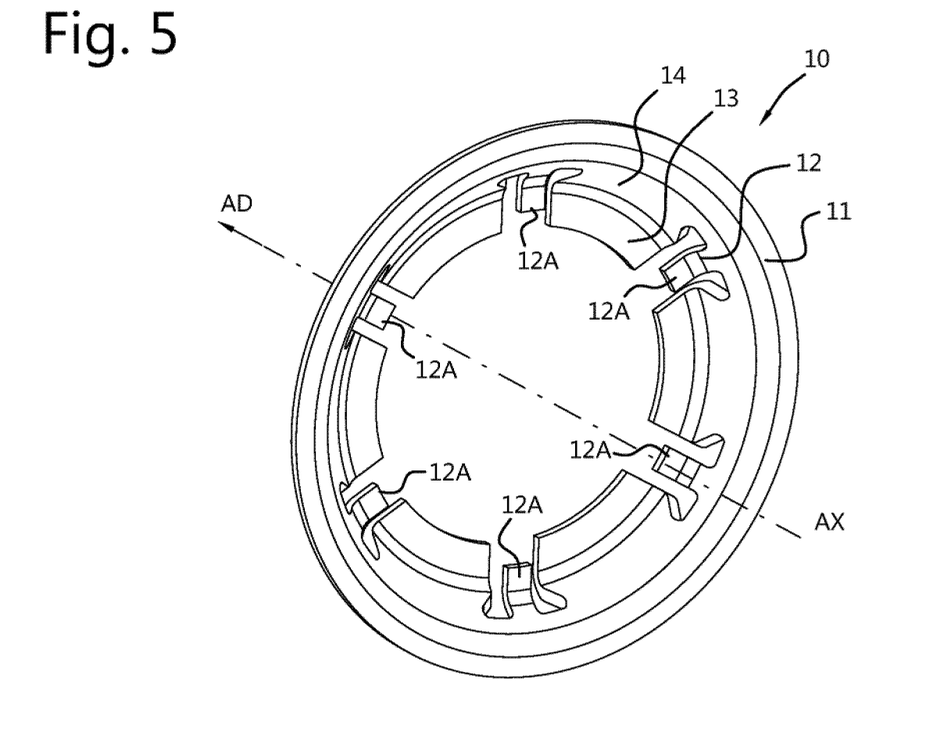
FIG. 5 shows a schematic perspective view of another retaining element according to an aspect of the invention.

FIG. 5 shows a schematic perspective view of another retaining element 23 according to an aspect of the invention. Compared to FIG. 1A, the inner, flanged ring-shaped structure 13 in FIG. 5 is interrupted the circumferential direction C, thereby forming multiple separate flange sections that are individually connected to the outer ring-shaped structure 11 via the corresponding intermediate parts 14. Again, the intermediate parts 14 and the lugs 12 are alternately located in the circumferential direction C.

Figure 6:
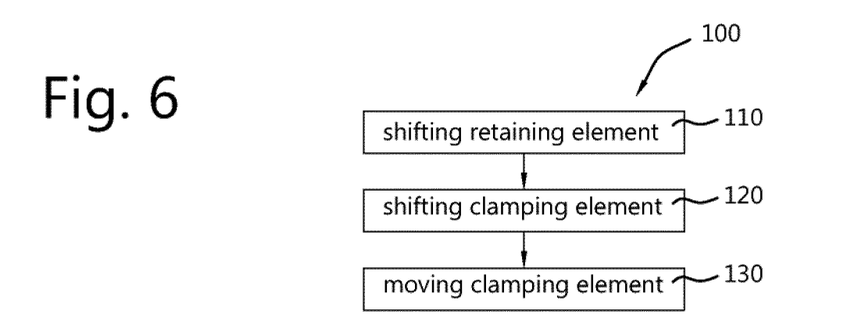
FIG. 6 shows a flow chart of a method for assembling according to an aspect of the invention.

FIG. 6 shows a flow chart of a method according to an aspect of the invention. The method is used for assembling a shaft assembly. The method 100 comprises a step of providing 110 a shaft which is configured to rotate and to transfer torque, the shaft having a shaft attribute mounted thereon, a step of shifting 120 a retaining element on the shaft reaching the shaft attribute, the retaining element having a mainly annular geometry extending in a circumferential direction around the shaft, the retaining element further being provided with a locking element located offset from the shaft, a step of shifting 130 a clamping element on the shaft for counteracting movement of the shaft attribute mounted on the shaft in at least one axial direction, the clamping element having a mainly annular geometry extending in a circumferential direction around the shaft, the clamping element further having two circumferential end portions opposing each other, wherein the clamping element is elastically deformable between a relaxed state wherein the two circumferential end portions are located relatively close to each other and a widened state wherein the end portions are located relatively remote from each other in the circumferential direction, and a step of moving 130 the clamping element towards an axial position on the shaft wherein the clamping element is radially locked between the shaft and the locking element of the retaining element.

In a preferred embodiment, the moving step 130 includes a sub-step of pushing the clamping element in an axial direction towards the shaft attribute, against the retaining element, such that at least one radially inwardly extending lug of the retaining element elastically deforms from a relaxed position towards a tensioned position bending towards the shaft attribute, a sub-step of axially aligning the clamping element with a groove in the shaft, and a sub-step of snapping the clamping element into the groove, such that the at least one radially inwardly extending lug of the retaining element elastically deforms back to the relaxed position, thereby radially locking the clamping element.

Figure 7:
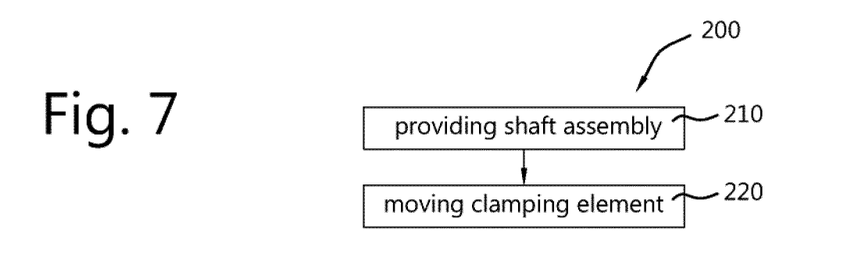
FIG. 7 shows a flow chart of a method for de-assembling according to an aspect of the invention.

FIG. 7 shows a flow chart of a method according to an aspect of the invention. The method is used for de-assembling a shaft assembly. The method 200 comprises a step of providing 210 a shaft assembly according to claim 1 which is configured to rotate and to transfer torque, the shaft having a shaft attribute mounted thereon, and a step of moving 220 the clamping element axially from an axial position on the shaft wherein the clamping element is axially locked between the shaft and the locking element of the retaining element, away from the shaft attribute.

In a preferred embodiment, the moving step 220 includes a sub-step of elastically deforming the at least one radially inwardly extending lug of the retaining element from a relaxed position towards a tensioned position bending towards the shaft attribute, a sub-step of elastically deforming the clamping element towards the widened state, a sub-step of axially moving the clamping element away from the shaft attribute, and a sub-step of axially moving the retaining element away from the shaft attribute.

The invention is not restricted to the embodiments described above. It will be understood that many variants are possible.

These and other embodiments will be apparent for the person skilled in the art and are considered to fall within the scope of the invention as defined in the following claims. For the purpose of clarity and a concise description features are described herein as part of the same or separate embodiments. However, it will be appreciated that the scope of the invention may include embodiments having combinations of all or some of the features described.

The invention claimed is:

1. A shaft assembly for a rotating machine, comprising:
   a shaft which is configured to rotate and to transfer torque;
   a clamping element positioned on the shaft for counteracting or limiting movement of a shaft attribute mounted on the shaft in at least one axial direction, the clamping element having a mainly annular geometry extending in a circumferential direction around the shaft, the clamping element further having two circumferential end portions opposing each other, wherein the clamping element is elastically deformable between a relaxed state wherein the two circumferential end portions are located relatively close to each other and a widened state wherein the two circumferential end portions are located relatively remote from each other in the circumferential direction; and a retaining element positioned on the shaft, the retaining element having a mainly annular geometry extending in the circumferential direction around the shaft, the retaining element further being provided with a multiple number of locking elements located offset from the shaft such that the clamping element is radially locked between the shaft and the locking elements, wherein the retaining element has an outer ring-shaped structure and wherein the multiple number of locking elements are formed as lugs extending radially inwardly from the outer ring-shaped structure towards the clamping element, the lugs being mainly evenly distributed in the circumferential direction and concentrically surrounding the clamping element, wherein the radially inwardly extending lugs are axially elastically deformable between a relaxed position radially locking the clamping element and a tensioned position radially releasing the clamping element, wherein the retaining element has a flanged inner ring-shaped structure for transferring axial forces from and/or towards the clamping element and the shaft attribute, wherein a radius of the flanged inner-shaped structure is smaller than a radius of the outer ring-shaped structure, wherein the retaining element comprises intermediate parts interconnecting the outer ring-shaped structure with the flanged inner ring-shaped structure, wherein the flanged inner ring-shaped structure is slightly axially offset along an offset distance in an axial direction relative to the lugs, and wherein the intermediate parts and the lugs are alternately located in the circumferential direction.

2. The shaft assembly according to claim 1, wherein the retaining element is mainly elastically non-deformable in a radial direction from a center axis of the shaft.

3. The shaft assembly according to claim 1, wherein the retaining element includes a closed annular frame or an annular sheet.

4. The shaft assembly according to claim 1, wherein each lug is elastically deformable in the at least one axial direction.

5. The shaft assembly according to claim 1, wherein the shaft is provided with a groove receiving the clamping element.

6. The shaft assembly according to claim 1, wherein the clamping element is a circlip.

7. The shaft assembly according to claim 1, wherein the shaft attribute is a bearing or a gear.

8. A method for de-assembling a shaft assembly, comprising the steps of:

providing the shaft assembly according to claim 1 which is configured to rotate and to transfer torque, the shaft having the shaft attribute mounted thereon, moving the clamping element axially from an axial position on the shaft wherein the clamping element is axially locked between the shaft and the locking elements of the retaining element, away from the shaft attribute.

9. The method according to claim 8, wherein the moving step includes the sub-steps of:

elastically deforming at least one radially inwardly extending lug of the retaining element from a relaxed position towards a tensioned position bending towards the shaft attribute, elastically deforming the clamping element towards the widened state, axially moving the clamping element away from the shaft attribute, and axially moving the retaining element away from the shaft attribute.

10. A method for assembling a shaft assembly, comprising the steps of:

providing a shaft which is configured to rotate and to transfer torque, the shaft having a shaft attribute mounted thereon, shifting a retaining element on the shaft reaching the shaft attribute, the retaining element having a mainly annular geometry extending in a circumferential direction around the shaft, the retaining element further being provided with a multiple of locking elements located offset from the shaft, shifting a clamping element on the shaft for counteracting or limiting movement of the shaft attribute mounted on the shaft in at least one axial direction, the clamping element having a mainly annular geometry extending in the circumferential direction around the shaft, the clamping element further having two circumferential end portions opposing each other, wherein the clamping element is elastically deformable between a relaxed state wherein the two circumferential end portions are located relatively close to each other and a widened state wherein the two circumferential end portions are located relatively remote from each other in the circumferential direction, and moving the clamping element towards an axial position on the shaft wherein the clamping element is radially locked between the shaft and the locking elements of the retaining element, wherein the retaining element has an outer ring-shaped structure and wherein the multiple number of locking elements are formed as lugs extending radially inwardly from the outer ring-shaped structure towards the clamping element, the lugs being mainly evenly distributed in the circumferential direction and concentrically surrounding the clamping element, wherein the radially inwardly extending lugs are axially elastically deformable between a relaxed position radially locking the clamping element and a tensioned position radially releasing the clamping element, wherein the retaining element has a flanged inner ring-shaped structure for transferring axial forces from and/or towards the clamping element and the shaft attribute, wherein a radius of the flanged inner ring-shaped structure is smaller than a radius of the outer ring-shaped structure, wherein the retaining element comprises intermediate parts interconnecting the outer ring-shaped structure with the flanged inner ring-shaped structure, wherein the flanged inner ring-shaped structure is slightly axially offset along an offset distance in an axial direction relative to the lugs, and wherein the intermediate parts and the lugs are alternately located in the circumferential direction.

11. The method according to claim 10, wherein the moving step includes the sub-steps of:

pushing the clamping element in the at least one axial direction towards the shaft attribute, against the retaining element, such that at least one radially inwardly extending lug of the retaining element elastically deforms in the at least one axial direction from a relaxed position towards a tensioned position bending towards the shaft attribute, axially aligning the clamping element with a groove in the shaft, and snapping the clamping element into the groove, such that the at least one radially inwardly extending lug of the retaining element elastically deforms in the at least one axial direction back to the relaxed position, thereby radially locking the clamping element.

* * * * *